United States Patent Office 3,832,242
Patented Aug. 27, 1974

3,832,242
BRAZING AND SOLDER COMPOSITIONS
COMPRISING A CHELATING AGENT
Stanley G. Cuthbert, Munster, Ind., assignor to
SCM Corporation, Cleveland, Ohio
No Drawing. Continuation-in-part of abandoned application Ser. No. 57,822, July 23, 1970. This application Aug. 17, 1972, Ser. No. 281,543
Int. Cl. B23k 35/34
U.S. Cl. 148—24                        10 Claims

ABSTRACT OF THE DISCLOSURE

Improved brazing or soldering paste compositions comprising a metalliferous or brazing solder powder and a fugitive resinous binder have been developed. The improvement comprises a chelating agent dispersed therein in a proportion of about 0.3–10% by weight of the binder, the chelating agent being selected from the group consisting of tetrakis hydroxyalkyl derivatives of alkylene diamines, tetrakis carboxy alkyl derivatives of diamine, alkali metal salts of tetrakis carboxy alkyl derivatives of alkyl diamines and hydroxy carboxylic acids.

---

This application is a continuation-in-part of my application having Ser. No. 27,822 (Series of 1970) and having a filing date of July 23, 1970, now abandoned. All information set forth in that case is hereby incorporated by reference.

Brazing and solder compositions in the semi-fluent state, e.g., pastes, for metal working have been widely used where the shaped solid metal slugs, foils, strips, etc., have been difficult to use in such brazing and soldering operations. One of the major problems encountered with the use of such brazing or soldering compositions in semi-fluent form has been the tendency of the suspended metalliferous powder to settle out prior to application. As a result, it became very difficult to apply a predetermined quantity of the metalliferous powder to the joint, thereby necessitating the reblending of the brazing composition prior to application.

There is an abundance of information written about the brazing and soldering art as such art has been in use for centuries. Descriptions of brazing and soldering equipment used for carrying out the brazing and soldering operations as well as metals which can be brazed or soldered have also been reported. Furthermore, brazing and soldering filler materials, i.e., the compositions of metals, metal alloys used as a filler material in brazing and soldering, are also described in the literature. Texts particularly good in describing the state of the art are Kirk and Othmer Encyclopedia, Volume 18, pages 541 through 548 published by McGraw-Hill in 1971; the book entitled *Brazing Manual*, published by the American Welding Society 1963; *Specification for Brazing Filler Metal* published by the American Welding Society in 1969 and the "Welding and Brazing" section of the *Metals Handbook*, 8th edition, volume 6, published by the American Society for Metals in 1971. Such information relating to brazing and solder filler metals used for brazing is incorporated by reference.

Advantages of the compositions set forth herein for metal-working include: excellent stability of the semi-fluent composition and metalliferous powder therein; excellent flow control of the semi-fluent composition for extruding, spraying or otherwise applying the composition to the workpiece; excellent adherence of the composition on application to the workpiece; and substantially uniform dosages of powder to the workpiece.

An improved brazing or soldering paste composition comprising a metalliferous brazing or solder powder and a fugitive resinous binder is provided with the improvement comprising a chelating agent dispersed in said brazing or soldering paste composition in a proportion of from about 0.3–10% by weight of the binder, said chelating agent selected from the group consisting of tetrakis hydroxyalkyl derivatives of alkylene diamines, tetrakis carboxy alkyl derivatives of diamines alkali metal salts of tetrakis carboxy alkyl derivatives of alkyl diamines, and hydroxy carboxylic acids.

In brazing alloys (and silver soldering alloys), the principal constituents usually are copper, silver, nickel, cadmium, and/or zinc. Sometimes, it is advantageous to use copper alone as a brazing alloy or copper dosed with minute proportions of phosphorous, silicon, manganese, or aluminum. Also, other minor constituents for alloying use generally include gold, indium, boron, bismuth, antimony, chromium, titanium, and lead. When the brazing or silver soldering of a joint is practiced in a reducing atmosphere, the oxides of metals reducible under those conditions to the elemental metal can be used (e.g., oxides of the non-refractory type) such as copper oxide, silver oxide, nickel oxide, zinc oxide, and the like.

Particularly desirable brazing compositions which have been well suited for the practice of the present invention are those employing a copper base for brazing at a temperature of from 1300–2100° F. and those employing a nickel base for brazing at temperatures from 1900-2400° F. Copper alloy brazing compositions as a filler metal for making brazing powders are found on page 548 in the Kirk and Othmer Encyclopedia cited hereinbefore. Pages 152 through 165 and pages 195–205 of the cited *Brazing Manual* by the American Welding Society describe the nickel base systems. Further compositions of copper and nickel brazing alloys are found in the *Brazing and Welding Handbook* by the Metal Society. All brazing compositions cited in each of these references are incorporated by reference as being exemplary of the brazing compositions suitable for practicing the invention. Silver, gold, and palladium brazing solder combinations are also reported in these references and can be used, but are quite expensive and, therefore used in selected applications. For reasons of efficiency and economy, the copper and brass powder alloys thereof, and the nickel base alloys for brazing purposes are the preferred metalliferous powders used in the formulation of the brazing compositions.

For reasons of clarity, the term "metalliferous powders" is meant to refer to those brazing or solder alloys compositions conventionally used in the brazing or soldering art as cited herein.

The metalliferous alloys materials are comminuted to a fine particulate form (powder) so that they are easily dispersed in the fugitive binder and maintained in suspension. Additionally, such comminution often provides for quicker melting and better flow of the metalliferous powder into the joint at the brazing temperature. The metalliferous powder typically is finer than 100 mesh U.S. Standard Sieve as larger particles are difficult to disperse and maintain uniform in the paste. Metal powders having a particle size of 325 mesh U.S. Standard Sieve, and finer, are employed generally and are quite satisfactory for making the compositions of the present invention. However, the use of metal powders having particles finer than 325 mesh U.S. Standard Sieve often does not result in corresponding improvement in the suspendability of the metalliferous powder or stability of the composition.

Fugitive binders containing resin have been employed in preparing brazing and soldering compositions and are widely used for facilitating the adhesion of metal powder to the metal substrate to be worked, e.g., brazed, soldered, filled, etc. These fugitive binders are typified by having a low Conradson value below about 1% so that very little, if any, carbonaceous material remains as a residue after metal-working which may interfere with the strength or appearance of the worked part. The Conradson test is described in ASTM Standards D–189–46, Part III–A, page 120 (1946) and is also referenced in U.S. Pat. 2,566,339.

The binders are fugitive in that they decompose at the working temperature of the heated zone and preferably much lower, e.g., 400–550° F. The fugitive binders on decomposing, form volatile compounds which either burn or pass off as gaseous material. Any residue might interfere with the strength of the joint, etc. resulting from working. The fugitive binder should also be smokeless and odorless at the temperature of the heated zone so that it will not interfere with the operation. Additionally, the fugitive binders should be quicksetting on application to prevent the metalliferous powder from blowing away or rubbing off prior to heating in the heated zone. Typically, these resins set by air hardening and form a film. Air hardening may be simply volatilizing of solvent resulting in coalescence of the binder particles.

Resins for making up the fugitive binders having the above properties and conventionally used in preparing brazing and solder compositions are homopolymers and copolymers of the lower alkyl esters of acrylic and methacrylic acid (those having from 1–8 carbon atoms), e.g., methylmethacrylate, ethylacrylate, methylacrylate, 2-ethyl hexyl acrylate, or mixtures thereof, polystyrene, polyvinyl chloride, polyvinyl acetate, butadienestyrene latices, polytetrafluoroethylene, cellulosic polymers, e.g., cellulose acetate, cellulose nitrate, cellulose acetate butyrate, etc., polyolefins, e.g., polypropylene, polyethylene, epoxy resins, polyesters, rosin, e.g., tall oil rosin, gum rosin, etc. For efficiency and economy, the lower alkyl esters ($C_1$–$C_6$) of acrylic and methacrylic acid are preferred. The resin is used primarily to hold the metalliferous powder on the workpiece prior to actual working. Sufficient resin is used to accomplish such holding which is usually from about 15–50% resin by weight of fugitive binder. Because the resin is burned away during brazing, welding, etc. the amount of resin used is kept at a minimum where possible to reduce costs.

Chelating agents sometimes referred to as complexing agents or ligands for complexing metals of the type used herein are widely known and can be used in practicing this invention.

The chelating agents useful for practicing this invention comprise tetrakis hydroxy alkyl derivatives of alkylene diamines, tetrakis carboxy derivatives of alkylene diamines, alkali metal salts of tetrakis carboxy alkyl derivatives of alkylene diamines, and hydroxy carboxylic acids. Generally, the alkali metal salts of the tetrakis carboxy alkyl derivatives of alkylene diamines leave a residue, believed to be caused by the alkali metal in the salt. These salts are not used often because of this deleterious affect on the joint. The other totally organic chelating agents do not leave a residue and are preferred. Sequestering agents differ from the chelating agents in that the sequestering agent reacts with the metal ion to produce a soluble complex. But, for purposes of this invention, the term chelating agent includes sequestering agents.

Virtually any type of chelating agent, optionally dispersed in water or solvent, can be used in this invention. The chelating agent should be one that on heating to the brazing or soldering temperature does not leave a substantial carbonaceous or metal ash of more than 0.5% by weight as measured by the Conradson test and does not produce an offensive odor or smoke.

A minor proportion of chelating agent relative to the portion of resin in the binder is used for enhancing the stability of the suspension formed on dispersing the metalliferous powder in the fugitive binder. Generally an effective proportion of chelating agent between about 0.3–10% by weight of the fugitive binder, and preferably between about 0.5–2% is employed.

Organic chelating agents as opposed to inorganic chelating agents are particularly adapted for use in preparing the brazing and solder compositions because they leave relatively small amounts of ash, if any, as residue and burn away during the brazing or solder operation. Inorganic chelating agents often leave a slight amount of metal ash after metal-working in the heated zone and the metal compound may not be compatible with the metalliferous powder or workpiece.

The tetrakis carboxy alkyl derivatives of alkylene diamines and alkali metal salts often are referred to as amino polycarboxylic acid and alkali metal salts thereof. Examples of this chelating agent include ethylene diamine tetracitric acid, N-hydroxyethyl ($N_1,N_1,N_1$-ethylethylene diamine triacetic acid) and the alkali metal salts thereof.

The tetrakis hydroxy alkyl derivatives of alkylene diamine include $N,N,N_1,N_1$-tetrakis 2-hydroxypropylethylene diamine, N, N, $N_1$, $N_1$-tetrakis, 2-hydroxypropyl propylene diamine, and so forth. Hydroxy carboxylic acids are known as being effective chelating agents and these are the type referred to here. They generally have from 3–6 carbon atoms in the structure such as tartaric, lactic, gluconic, citric, and hydroxy acetic acid. Other conventional chelating agents such as the amino alcohols, e.g., diethanol amine and triethanol amine, hydroxy-$\beta$-diketones, e.g., acetyl acetonate, which provide minor chelation when mixed with brazing or soldering paste compositions, do not impart the stability that the stronger chelating agents set forth above impart to the brazing and soldering paste compositions. Stability of only a few days is noted with the weaker and conventional chelating agents, whereas the chelating agents described herein impart stabilities of several weeks to months. It is believed that enhanced stability of the dispersion is primarily due to firstly, the chelating action of the agent, i.e., tying up the metalliferous powder, and secondly, the reaction of the chelating agent with the resin to form a thickened mixture.

Optionally, solvents can be used where desired for dissolving the resins and to place the fugitive binder composition in a form suitable for application. The solvent should volatilize readily at temperatures of about 300° F. and decompose without producing substantial amount of carbonaceous residue, smoke or odor during a brazing operation. Additionally, the solvent should be relatively non-volatile of about 70° F. and atmospheric pressure. If the solvent is too volatile, the fugitive binder will have a tendency to dry out without resulting adhesion and the metalliferous powder and fugitive binder may blow away prior to brazing. Advantageously, hydrocarbons such as hexane, heptane, kerosene, pentane, aromatic solvents such as benzene, naphthas toluene having a boiling point of up to 450° F. at atmospheric pressures, ketone solvents such as acetone, methylisobutyl ketone, methyl ethyl ketone, isobutyl ketone, and the like, glycols, such as ethylene, propylene, and diethylene glycol, esters such as methyl acetate, ethyl acetate, butyl acetate, monoethyl ether acetate, and the like, alcohols such as ethanol, propanol, methanol, ether alcohols such as 2-ethoxy ethanol, 2-ethoxy butanol, and ether ketones such as 4-methoxy-4-methyl-pentanone-2-, and the like can be employed. Water can also be used as a solvent. However, water is often objectionable because the composition spatters in the heated zone.

In formulating the fugitive binder, various proportions of solvents can be used in dissolving the resin and dispersing the metalliferous powder for achieving desired composition viscosities. Composition viscosities, for example, can range from 3,000 to over 100,000 centipoises at 75° F. Compositions having lower viscosities normally are used for applications by spray or brush techniques. Compositions having higher viscosities are employed when the material is spread with a doctor blade, putty knife, etc. Generally, the fugitive binder contains from 50–90% solvent by weight and preferably about 80% to give a 20% solids content.

Optionally fluxes can be used as an additive to the brazing or solder compositions where desirable. Virtually any of the fluxes used in such brazing or soldering compositions can be employed here and examples of such fluxes include alkali metal fluoroborates, alkali metal carbonates, alkali metal tetraborates, boric acid, and hydrohalide salts of hydroxyamines such as 2-amino-2-methyl-1,3-propanediol. Preferably not more than 10% of such fluxing agent by weight of the composition is used.

Th materials adapted for working with this composition primarily are the ferrous-containing materials, e.g., iron, cast iron, steel, e.g., stainless, mild, low and high carbon, etc., aluminum, brass, alloys, and the like. The compositions can be used for conventional metal-working, e.g., to fill voids, pits, and the like or used in forming a metal or porous metal film.

In working with the composition, it is applied to the part and allowed to set so that the composition will not blow away or rub off. The coated part then is introduced to a heated zone wherein the metalliferous powder in the composition fuses to metal flowing into the joint, pit, etc. The fugitive binder volatilizes at the zone temperature thereby leaving essentially metal and little, if any, carbonaceous or ash material. The zone can be heated by a furnace as in furnace brazing, acetylene-oxygen torch, hot salt bath, electrical means, and other conventionally used techniques in brazing or soldering.

The following examples are provided to illustrate preferred embodiments of the invention but are not intended to limit the scope thereof. All parts are parts by weight, all percentages are weight percentages, and all degrees are degrees Fahrenheit, unless otherwise specified.

EXAMPLE I

A low viscosity brazing composition for spraying or dip operation is prepared by charging to a vessel 2.2 parts of an aqueous solution containing 30% of tetrasodium ethylenediamine tetraacetate, 26.8 parts of 4-methoxy-4-methyl pentanone-2 and 11 parts of a solid particulate polymer polymerized from a 50 part ethylacrylate: 50 part methylmethacrylate mixture, having a specific gravity of 1.19 g./cc. and pencil hardness of H at 180° and 300°. When 40 parts polymer are dissolved in 60 parts toluene, the viscosity of the resultant solution is between 400–700 centipoises at 30° C. The charged materials are agitated until the copolymer is dissolved to form a dispersion. Sixty parts of copper powder passing through a 200 mesh U.S. Standard Sieve are added to the dispersion and then agitated until the copper powder is thoroughly mixed and suspended therein. The resultant dispersion on mixing thickens with apparent reaction between the chelating agent and resin and forms a dispersion. The viscosity of the dispersion is 9,000 centipoises at 78° F. The dispersion is extremely stable with very little copper powder settling out over a period of 4 hours.

Steel workpieces to be joined are coated with the composition prepared above at the joint of junction. On application, the composition sets up in about one minute. The workpieces then are passed into a furnace and heated to a temperature of 2050° F. for about 15 minutes in a reducing atmosphere until a substantially uniform temperature is reached, then cooled to room temperature (70° F.). The resulting brazed joint is extremely strong having substantially uniform amount of copper over the total area of the joint. No carbonaceous ash remains.

EXAMPLE II

A high viscosity brazing composition is prepared in the same manner as the brazing composition in Example I, except the chelating agent is $N,N,N_1,N_1$-tetrakis-2-hydroxypropyl ethylenediamine and 80 parts copper powder are used instead of 60 parts. The resultant composition has a viscosity of 120,000 centipoises at 75° F. and is extremely stable with very little copper powder settling out over a period of several weeks. Steel workpieces are joined with this brazing composition and the resulting joints are found to be extremely strong.

EXAMPLE III

A brazing composition is prepared in the same manner as in Example I, except the chelating agent is titanium acetyl acetonate. The resultant composition is extremely stable. A joint brazed with this composition is strong, however, some of the titanium remains as metal ash.

EXAMPLE IV

A brazing composition is prepared in the same manner as the brazing composition in Example II, except that the chelating agent triethanolamine is used. The level of triethanolamine employed remains the same as the chelating agent in Example II. The resultant composition behaved like Newtonian fluid and settling began almost immediately. At the end of a three-day period, the powder had settled out hard and could not be redispersed.

EXAMPLE V

A brazing composition is prepared in the same manner as the brazing composition in Example II, except the filler metal is a nickel base alloy, whose nominal composition is 14% Cr; 3% B; 4% Si; 4% Fe; 0.7% C; and the balance Ni. The resultant composition is extremely stable with little settling over a period of several weeks. A stainless steel workpiece was joined utilizing the above brazing composition at 2100° F. under a protective atmosphere of dry hydrogen. The resulting joint was extremely strong.

What is claimed is:

1. In a brazing or soldering composition wherein a metalliferous powder is dispersed in a fugitive binder, the improvement which comprises a chelating agent dispersed in said binder in a proportion of about 0.3–10% by weight of the binder for maintaining said powder suspended therein, said agent is selected from the group consisting of tetrakishydroxyalkyl derivatives of alkylene diamines, tetrakiscarboxyalkyl derivatives of diamines, alkali metal salts of tetrakiscarboxylalkyl derivatives of alkylene diamines, and hydroxycarboxylic acids, said powder having a particle size between 100 and 325 Mesh (U.S. Std. Sieve Series) and being present in a proportion of from about 55 to 80% by weight of the composition, while said binder being present from about 25 to 40% by weight of the composition, and said binder comprising by weight from about 10 to 50% of a resinous material having a Conradson carbon value of about 1% and from about 50 to 90% of an organic solvent.

2. The composition of Claim 1 wherein said metalliferous powder is copper or copper oxide.

3. The composition of Claim 1 wherein said metalliferous powder is brass.

4. The composition of Claim 1 wherein said metalliferous powder is nickel or alloys thereof.

5. The composition of Claim 1 wherein said chelating agent is $N,N,N_1,N_1$-tetrakis-2-hydroxypropyl ethylene diamine.

6. The composition of Claim 1 wherein said chelating agent is tetrasodium ethylenediamine tetraacetate.

7. The composition of Claim 1 wherein said resinous material is a polymerized ester of acrylic or methacrylic acid.

8. The composition of Claim 1 which further includes a fluxing agent not substantially more than 10% by weight.

9. The composition of Claim 8 wherein said fluxing agent is selected from the group consisting of alkali metal fluoroborates, alkali metal carbonates, alkali metal tetraborates, boric acid, and hydrohalide salts of hydroxyamines.

10. The composition of Claim 9 wherein said fluxing agent is 2-amino-2-methyl-1,3-propanediol.

References Cited

UNITED STATES PATENTS

| | | | |
|---|---|---|---|
| 2,100,974 | 11/1937 | Neilson | 148—25 |
| 2,169,659 | 8/1939 | Noble et al. | 148—126 |
| 2,480,723 | 8/1949 | Evans et al. | 148—24 |
| 2,594,313 | 4/1952 | Klinker | 148—25 |
| 2,745,769 | 5/1956 | Linnert et al. | 117—132 |
| 3,459,602 | 8/1969 | Mueller | 106—48 X |
| 3,551,197 | 12/1970 | Lindquist | 106—39 R |
| 2,553,226 | 5/1951 | Williams | 148—25 |
| 2,522,937 | 9/1950 | Forker | 148—25 |
| 3,030,241 | 4/1962 | Brightly | 148—23 |
| 3,597,285 | 8/1971 | Aronberg | 148—26 |
| 2,844,479 | 7/1958 | Miller | 148—25 |
| 3,065,538 | 11/1962 | Melchiors et al. | 148—25 |
| 3,272,861 | 9/1966 | Riggs | 148—25 |
| 3,589,932 | 6/1971 | Burne | 148—24 |
| 3,575,738 | 4/1971 | Becker | 148—25 |

OTHER REFERENCES

Martell, A.; *Chelation,* in *Chemistry of Metal Chelates Compounds;* New York, 1952, pp. 9–15.

Dwyer, F.; *Bidentate Chelates,* in *Chelating Agents And Metal Chelates;* New York, 1964, pp. 95–97.

Chaberer, S.; *Types of Metal Chelate Compounds;* in *Organic Sequestering Agents;* New York, 1959, pp. 6–9.

Heslop, R., et al.; *Inorganic Chemistry;* New York, 1967, pp. 565–9, 586–95 and 599–601.

WALTER R. SATTERFIELD, Primary Examiner

U.S. Cl. X.R.

148—23, 25, 26

UNITED STATES PATENT OFFICE
CERTIFICATE OF CORRECTION

PATENT NO. : 3,832,242
DATED : August 27, 1974
INVENTOR(S) : Stanley G. Cuthbert It is certified that error appears in the above-identified patent and that said Letters Patent are hereby corrected as shown below:

Column 3, line 48, after "carboxy" insert --alkyl--.
Column 3, line 48, cancel "alkylene".
Claim 10, line 2, after "is" insert --a hydrohalide salt of--.

Signed and Sealed this fifth Day of August 1975

[SEAL]

Attest:

RUTH C. MASON
Attesting Officer

C. MARSHALL DANN
Commissioner of Patents and Trademarks